United States Patent [19]

Stilwell, Jr. et al.

[11] Patent Number: 5,212,685
[45] Date of Patent: May 18, 1993

[54] CONTROL CIRCUIT FOR HALF-DUPLEX/SIMPLEX INTERFACE IN COMMUNICATION SYSTEM

[75] Inventors: George R. Stilwell, Jr., Raleigh; Theodore B. Vojnovich, Cary; Robert L. Walker, Raleigh, all of N.C.

[73] Assignee: International Business Machines Corporation, Armonk, N.Y.

[21] Appl. No.: 672,811

[22] Filed: Mar. 21, 1991

[51] Int. Cl.$^5$ .............................................. H04L 5/16
[52] U.S. Cl. ......................................... 370/31; 370/24
[58] Field of Search ......................... 370/24, 31; 375/7; 455/78, 79; 178/71 R, 71 A, 71 N

[56] References Cited
U.S. PATENT DOCUMENTS

| | | | |
|---|---|---|---|
| 3,979,723 | 9/1976 | Hughes et al. | 370/31 |
| 4,288,869 | 9/1981 | Kolodzey et al. | 370/31 |
| 4,672,601 | 6/1987 | Ablay | 370/31 |

Primary Examiner—Douglas W. Olms
Assistant Examiner—Alpus H. Hsu
Attorney, Agent, or Firm—Stephen T. Keohane

[57] ABSTRACT

An interface circuit for connecting an electrical half-duplex system to an optical simplex system includes logic which permits keep-alive signals to be gated onto the transmitting simplex fiber when data is not being received on the half-duplex conductor. The interface circuit includes receive logic connected in parallel with the receive data path. The receive logic responds to predetermined bit patterns in the received data to control the receive and transmit data path connections. The interface circuit also includes transmit logic connected in parallel with the transmit data path. The transmit logic responds to bit patterns in the data on the transmit data path to selectively gate the output of a keep-alive oscillator onto the transmit simplex fiber.

5 Claims, 3 Drawing Sheets

CONTROL CIRCUIT FOR HALF-DUPLEX/SIMPLEX INTERFACE IN COMMUNICATION SYSTEM

FIELD OF THE INVENTION

This invention relates to data communications and more particularly to a circuit for controlling the interface between a half-duplex system using an electrical conductor and a simplex system using optical fibers.

BACKGROUND OF THE INVENTION

A well known type of data communication system uses a single electrical conductor, usually a coaxial cable, to connect a data terminal to a controller capable of supporting many terminals. The most common form of this system is a half-duplex system. A half-duplex system is one in which data can be transmitted only in one direction on the cable at any given time; that is, data cannot be transmitted in opposite directions on the cable at the same time.

Conventionally, a controller transmits data to a terminal and waits for a response, indicating the terminal has received the data. If no response is received within a certain period of time, the controller assumes the data was not received and takes an appropriate action. The controller may, for example, re-transmit the data or may send an error message to a system operator.

Since the controller initiates all communications with the terminal, only the controller or the terminal should transmit at any given time. There should be no collision on the cable between controller-transmitted data and terminal-transmitted data.

Because the controller initiates data transfers on an as-needed basis, there will be times during which the half-duplex line is inactive or idle. Receiver circuitry in either the controller or the terminal may enter an idle state during such idle periods. To re-initialize the receiver circuitry, a preamble (a series of signals which precede actual data) is conventionally employed. The preamble resets a receive clock and delineates the beginning of the data itself. A postamble, a second series of signals which follow the actual data, is used to delineate the end of the message.

In some situations, it is desirable to connect a half-duplex system of the type described to a simplex system. A simplex system is one that uses separate conductors to carry transmitted and received data. Usually, data can be transmitted and received simultaneouly over the separate conductors.

One problem with any half-duplex/simplex interface is that the simplex transmitter circuit and the simplex receiver circuit have a common electrical connection at the half-duplex line connector. Means must be provided for preventing received simplex signals from returning or "echoing" to the simplex transmitter circuit through this common electrical connection.

Where the half-duplex and simplex systems use the same media, there are components which can be used to prevent such echoing from occurring. In systems using electrical conductors, devices known as hybrid transformers permit received simplex data to be applied to the half-duplex cable but not the local simplex transmitter. Where optical fibers are used, beam splitters can be used to transmit data to the half-duplex fiber but not to the local simplex optical transmitter.

Neither of these solutions can be used in a hybrid system; that is, an electrical half-duplex system interfaced to an optical simplex system.

A hybrid environment may exist where a terminal controller designed for electrical half-duplex operation is attached to a high-speed optical bus having dual transmit and receive optical fibers. The optical bus may be used either as a serial channel to a remote host processor or as a secure, high speed link to a supported terminal.

U.S. Pat. No. 4,288,869, assigned to the assignee of the present invention, addresses the problem of echoing in an electrical half-duplex/optical simplex interface. According to this patent, received simplex signals are applied to three parallel paths, each of which delays the signals by a different amount. The half-duplex system is connected to the path which introduces the intermediate amount of delay. The three paths provide inputs to a single NAND gate, the output of which is applied to a driver for the simplex transmitting fiber. The introduction of different amounts of delay into the received simplex signal prevents that signal from being passed through to the simplex transmitter.

The solution proposed by the patent works well for optical systems in which optical receivers operate properly for light levels which remain nominally constant over significant periods of time. Unfortunately, such receivers typically display low sensitivity to changes in applied optical signals and can not be used effectively with long optical busses.

A sensitive optical receiver will emit noise signals when a nominally constant optical signal is received for a lengthy period of time. The noise may interfere with the proper functioning of the circuit shown in the referenced patent. Moreover, over even relatively short periods of time, the internal sampling levels in a sensitive receiver may be so disturbed that subsequent optical bits are not correctly translated to electrical bits.

To avoid the problems mentioned above, simplex systems with sensitive optical receivers send a continuous idle signal (for example, repeated "1"'s) when data is not being transmitted. Such idle signals are conventionally referred to as keep-alive signals.

In a hybrid system, a continuous idle signal can cause problems since idle signals flowing in one direction would be collide with data flowing in the other direction.

DISCLOSURE OF THE INVENTION

The present invention is a control circuit for permitting keep-alive signals generated by a keep-alive source to be used at the interface between a half-duplex line and simplex lines.

The control circuit includes a receive control logic circuit connected in parallel with the receiving simplex line and the half-duplex line. The circuit generates one of two control signals upon detection of predetermined bit patterns in the received signals. A gating means responds to the first control signal to set up a first connection between the receiving simplex line and the half-duplex line while blocking a second connection between the half-duplex line and the transmitting simplex line. The gating means responds to the second control signal to take down the first connection while partially setting up the second.

The control circuit further includes a transmit control logic circuit connected in parallel with the half-duplex line and the transmitting simplex line. The transmit control circuit responds to predetermined bit patterns in received half-duplex data by generating either a third or a fourth control signal. A different gating means responds to the third control signal to complete the connection between the half-duplex line and the transmitting simplex line. This gating means responds to the fourth control signal to open the connection from the half-duplex line while gating the output of the keep-alive signal source onto the transmitting simplex line.

BRIEF DESCRIPTION OF THE DRAWINGS

While the technical description concludes with claims particularly pointing out and distinctly claiming that which is regarded as the present invention, details of a preferred embodiment of the invention may be more readily ascertained from the following technical description when read in conjunction with the accompanying drawings wherein:

TECHNICAL DESCRIPTION

Figure 1:
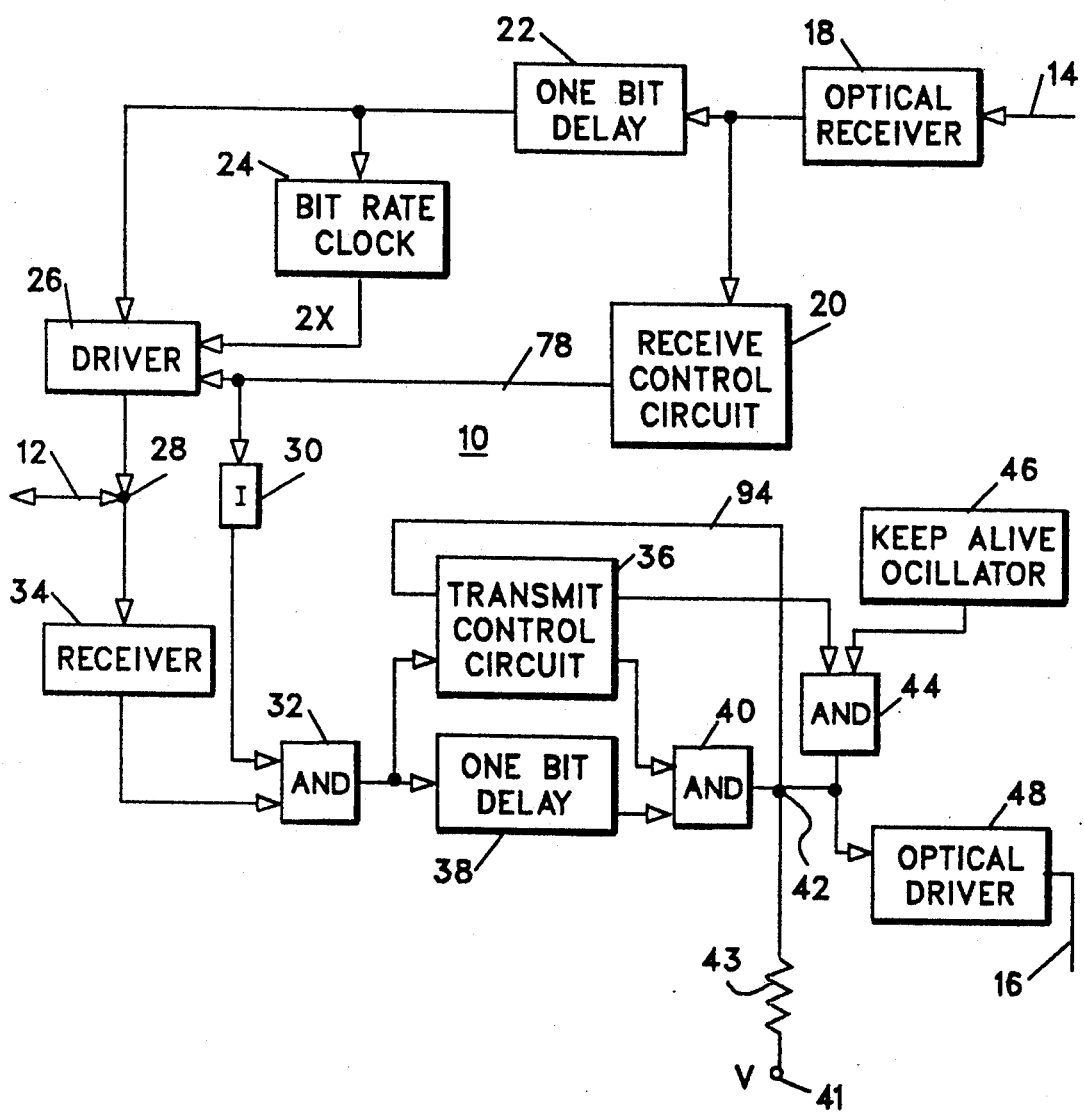
FIG. 1 is a block diagram of a half-duplex/simplex interface control circuit constructed in accordance with the present invention.

FIG. 1 is a block diagram of a control circuit 10 which provides an interface between a half-duplex system, represented by a half-duplex electrical line 12, and a simplex optical system, represented by a receiving optical fiber 14 and a transmitting optical fiber 16. Typically, the half-duplex line 12 takes the form of an coaxial cable.

The control circuit 10 performs the general function of controlling data received either from the half-duplex line 12 or the receiving simplex fiber 14 to permit the data to be routed through the interface without collisions or echoing.

Data received on the simplex fiber 14 is applied to an optical receiver 18, which converts the optical signal to its electrical analog. The output of the optical receiver 18 is applied both to a receive control circuit 20, which will be described in detail later, and to a delay circuit 22. Delay circuit 22, which is preferably conventional, delays the received signal by a predetermined amount. For Manchester-encoded signals, a term which is explained below, the amount of the delay is one bit time or one-half of a two-bit cell.

The output of delay circuit 22 is applied to a conventional clock circuit 24, which provides a clock signal having a bit rate frequency; that is twice the cell rate. The generated clock signal and the output of the delay circuit 22 are both applied to an electrical driver circuit 26, the output of which is connected to the half-duplex line 12 at a common connection point 28.

The receive control circuit 20 provides an additional input to the driver circuit 26 and to an inverter 30. The general function of the receive control circuit 20 is to enable either the driver circuit 26 or an AND gate 32. If the signal level at the output of circuit 20 is such that driver circuit 26 is enabled, the inverted signal appearing at the output of inverter 30 will cause AND gate 32 to be disabled. Conversely, if the output of circuit 20 disables the driver circuit 26, the inverted signal produced by inverter 30 will cause AND gate 32 to be at least partially enabled.

When data is being received on simplex fiber 14, the interface circuit, as described above, prevents that data from echoing to the transmitting simplex fiber 16 through a data path, including driver circuit 26, common connection 28, and an electrical receiver circuit 34.

Data received from the half-duplex line 12 is always applied to the AND gate 32 through the electrical receiver circuit 34. If the AND gate 32 is already partially enabled by the output of inverter 30, the received half-duplex data is forwarded to a transmit control circuit 36 and to a one-bit delay circuit 38. Transmit control circuit 36 is connected to AND gates 40 and 44. Opposite logic-level signals are applied to these AND gates by the transmit control circuit 36. That is, if a high or enabling signal is applied to AND gate 40, a low or disabling signal is concurrently applied to AND gate 44. Conversely, if AND gate 44 receives an enabling signal from transmit control circuit 36, then AND gate 40 concurrently receives a disabling signal.

A keep-alive oscillator 46 continuously generates a keep-alive signal, preferably a series of Manchester-encoded "1" signals which occur at the normal cell rate. The output of keep-alive oscillator 46 is either blocked or passed by AND gate 44, depending entirely on the state of the signal applied by transmit control circuit 36. AND gates 40 and 44 have a common connection 42 at the input to an driver circuit 48 for the transmitting simplex fiber 16. A "feedback" loop 94 connects point 42 to an input to the transmit control circuit 36 for reasons which are explained later.

The basic function of the transmit control circuit 36 is to allow either keep-alive signals (from oscillator 46) to be gated to driver circuit 48 while blocking any signals occurring at the output of delay circuit 38 or, conversely, to block the keep-alive signal while forwarding data signals from the half-duplex line 12.

Figure 2:
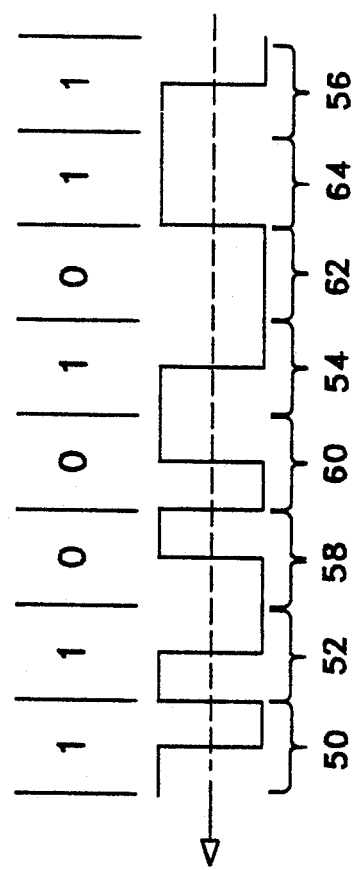
FIG. 2 is representation of a bit stream used to explain Manchester encoding.

Several references have been made to Manchester encoding. Manchester codes are explained with reference to FIG. 2. A conventional Manchester code requires that each binary signal (binary 1 or binary 0) be encoded in a two-bit cell having two signal level with a transition at the center of the cell. Transitions may or may not occur at the boundaries of the cell.

The value of the binary signal is determined by the direction of the transition. A binary 1 may be represented by a cell having a falling center transition. Cells 50, 52, 54 and 56 are examples of valid binary 1 signals. Conversely, a binary 0 may be represented by a cell having a rising center transition. Cells 58 and 60 are examples of valid binary 0 signals.

Since a center transition is always required for a valid binary 1 or a binary 0, it follows that the absence of a center transition represents a violation of Manchester encoding rules. Code violations are identified either as "1" violations or "0" violations depending on whether the signal level is high or low in the cell. Cell 62 shows a "0" code violation. Cell 64 shows a "1" code violation. Code violations can be used to delineate the start and end of data and are used in preamble and postamble bit patterns.

Figure 3:
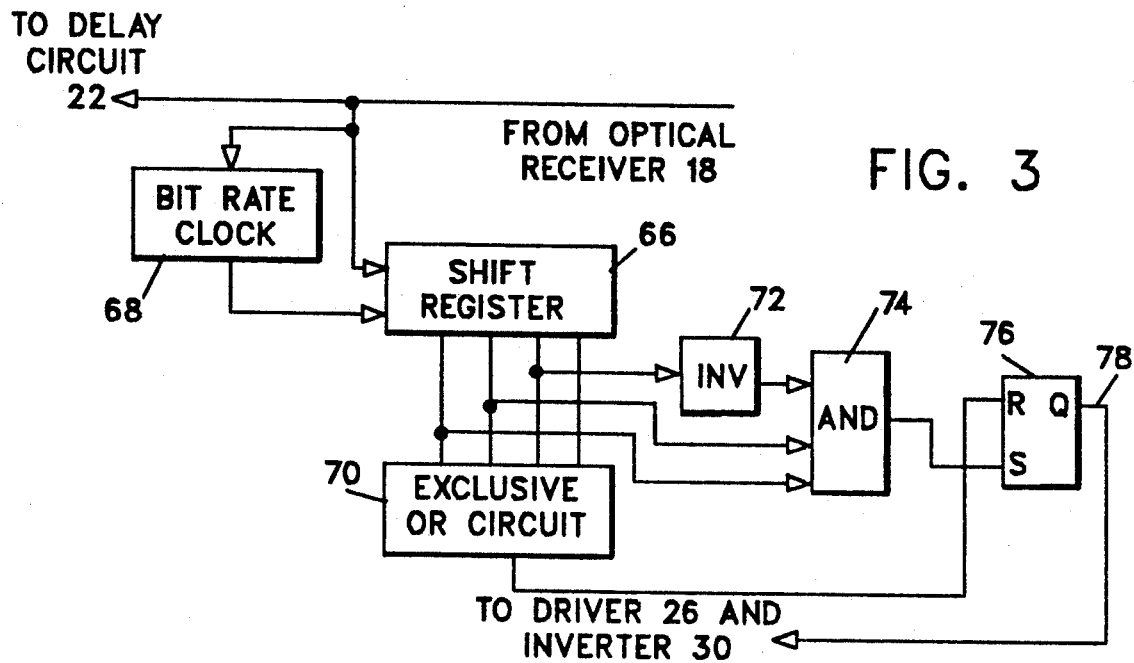
FIG. 3 is a schematic diagram of the transmit control circuit portion of the interface control circuit.
Figure 4:
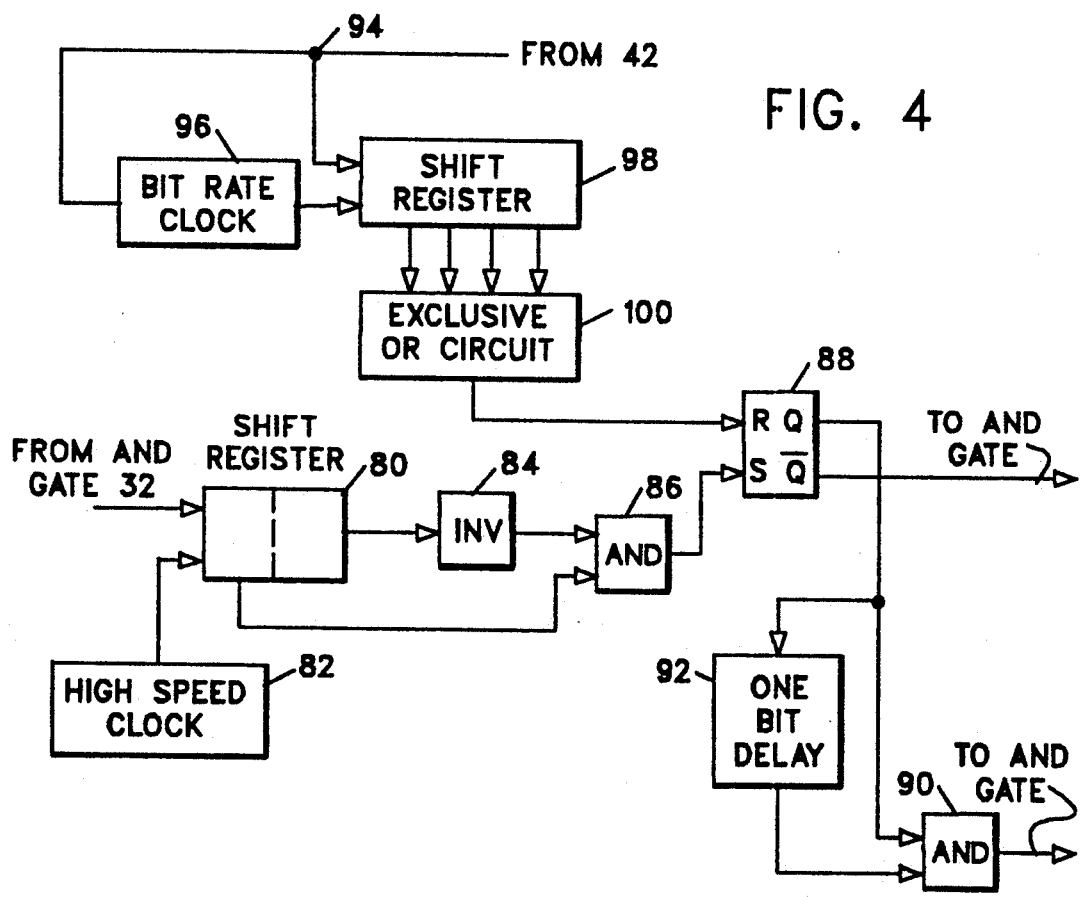
FIG. 4 is a schematic diagram of the receive control circuit portion of the interface control circuit.

FIG. 3 is a schematic diagram of the receive control logic circuit 20. Output signals from the optical receiver 18 (shown in FIG. 1) are applied both to a four stage shift register 66 and to a bit rate clock circuit 68. The clock circuit causes each bit in a received cell to be clocked into the shift register 66.

Shift register 66 has four outputs, one from each of its four stages. The four outputs are connected in parallel to an exclusive OR circuit 70, the output of which is connected to the Reset input of a bistable latch 76. Outputs from the first and second stages are connected directly to an AND gate 74 while an output from stage 3 is connected to the same AND gate through an inverter 72.

Figure 5:
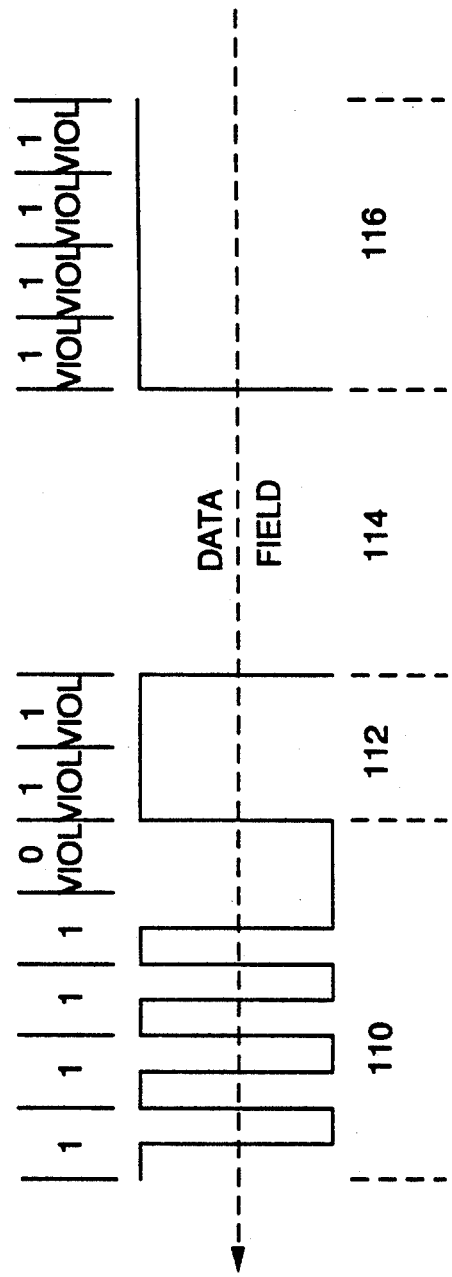
FIG. 5 is a representation of a bit stream which would be processed in accordance with the present invention, include a preamble, a data field and a postamble.

The components described above respond to predetermined bit patterns to identify the start or end of a data transmission and to drive latch 76 to the proper state. FIG. 5 illustrates a bit stream that could be expected to occur at the output of optical receiver 18 during receipt of a unit of data.

Referring to that figure, optical receiver will initially receive a string of binary 1 signals generated by a keep alive oscillator at circuitry at the opposite end of the optical fiber leading to optical receiver 18. The string, represented by segment 110 of the bit stream, will be of indefinite length.

At any given time, 4 successive bits in the string of binary 1 signals will be stored in shift register 66. The signals stored in successive stages will alternate in levels. For example, if the first and third stages store high-level bits, then the second and fourth stages will concurrently store low-level bits.

Since different stages in the shift register will be storing different logic level signals during receipt of the idle signal, exclusive OR circuit 70 will not change states. Also, because the first and third stages of the shift register will be at the same level when an idle signal is being clocked through the register, the output of AND gate 74 remains low whenever an idle signal is being received.

Since neither the AND gate 74 nor the exclusive OR circuit 70 can be driven high by the normal idle signal, the latch 76 remains unaffected in the presence of the idle signal. Latch 76, for reasons explained below, will be in its reset state as the idle signal is received and will produce a low level signal on its output line 78.

To indicate the beginning of a data transmission, the transmitter at the opposite end of the optical fiber inserts an intentional three bit Manchester code violation into the bit stream. The inserted code violation, represented by segment 112, is an 011 bit pattern.

When the 011 bit pattern is clocked into stages 1 through 3 of the shift register 66, all three inputs to AND gate 74 simultaneously go high, causing the AND gate to apply a high level output signal to the S or SET input of the latch 76. The latch 76 responds by generating a high level output on line 78.

Referring momentarily to FIG. 1, the high level signal on line 78 closes the connection between half-duplex line 12 and receiving simplex fiber 14 by enabling electrical driver circuit 26. The high level signal simultaneously isolates the transmitting simplex fiber 16 from the half-duplex line 12 since inverter 30 drives the high level output to a low level or disabling input to AND gate 32. Thus, data subsequently received on fiber 14 cannot echo through common connection 28 to the fiber 16.

Data received in a segment 114 is forwarded to the half-duplex line 12 through the driver 26 after a one bit delay in delay circuit 22. Data received in segment 114 may validly include the same 011 bit pattern which initially causes the latch 76 to become set. That does not pause a problem, however, since each occurrence of the 011 bit pattern will only attempt to drive the latch 76 to the same SET state it is already in.

The data is followed by a postamble 116 consisting of four successive bits of the same level; i.e., either a 0000 or a 1111 bit pattern depending on whether the last data bit ended at a high or a low level. When four successive bits of the same level are clocked into register 66, exclusive OR circuit 70 generates a high level output. The high level output from OR circuit 70 resets latch 76 to provide a low level signal on line 78.

Referring again momentarily to FIG. 1, the low level signal on line 78 disables driver circuit 26 and partially enables AND gate 32, which sets a partial connection between half-duplex data line 12 and simplex fiber 16.

Conventionally, the half-duplex line 12 is completely idle between data transmission; that is, no continuous or keep-alive signals are carried on line 12. To detect the start of a possible data transmission, an edge detector is formed by a two stage shift register 80, a high speed clock 82, an inverter 84 and an AND gate 86.

Signal levels on half-duplex line 12 are forwarded through AND gate 32 to the data input of the shift register 80. High speed clock 82 frequently samples the signal level. When a rising transition occurs, a 0 level signal will be loaded into the second stage of the shift register 80 at the same time a 1 level signal is loaded into the first stage. AND gate 86 is driven by an inverted second stage output and a direct first stage output from register 80 and thus produces a high level output signal when a rising transition occurs in the signal received from the half-duplex line 12.

The high level output signal from AND gate 86 sets a latch 88, to drive a Q output of the latch to a high level. The output of the latch 88 is applied directly to one input of an AND gate 90 and indirectly to the second input of the same AND gate through a one bit delay circuit 92.

The one bit delay circuit 92 prevents the output of AND gate 90 from going high for a one bit period after latch 86 is set. Referring momentarily to FIG. 1, it will be noted that data traveling between the half-duplex line 12 and the transmitting simplex fiber 16 is also delayed for a one bit period by a delay circuit 38. The one bit delay in triggering of AND gate 90 causes a corresponding delay in the partial enabling of AND gate 40; AND gate 40 is thus partially enabled by AND gate 90 coincident with the first arrival of data on the main data path.

AND gate 40 will remain enabled while data is being provided by the half-duplex line 12. When the data ends, the line 12 will go to a nominally constant state and will cause what appears to be a string of half-bit 1's or half-bit 0's at the output of AND gate 40. A "pull-up" circuit consisting of a voltage source 41 and a resistor 43 will bias the point 42 at a high logic level in the absence of data.

Data appearing at the output of AND gate 40 is "fed back" over a line 94 both to a bit rate clock circuit 96 and to a four stage shift register 98. When four successive half-bits of the same value (either 1's or 0's) have been shifted into shift register 98, the output of an exclusive OR circuit 98 will be driven high to reset latch 88.

When latch 88 enters its reset state, the resulting low level signal on its Q output drives the output of AND gate 90 to a low level. The low level output from AND gate 90, in turn, disables AND gate 40 (FIG. 1) to open the data path from the half-duplex line 12 to the transmitting simplex fiber 16.

When latch 88 resets, the inverted Q output goes high, of course. This output enables AND gate 44 (FIG. 1) to immediately begin gating the keep-alive signal generated by oscillator 46 onto the simplex fiber 16. The keep-alive signal will continue to be gated onto fiber 16 until the transmit control circuit 36 detects the next rising transition in the output from AND gate 32, signifying a new unit of data being received from half-duplex line 12. As explained above, circuit 36 responds to the detected transition to enable AND gate 40 in the data path and to disable AND gate 44 in the output path from keep-alive oscillator 46.

While there has been described what is considered to be a preferred embodiment of the present invention, variations and modifications in that embodiment may occur to those skilled in the art once they are made aware of the basic concepts of the invention. Therefore, it is intended that the appended claims shall be construed to include both the preferred embodiment and all such variations and modifications thereof that may occur to those skilled in the art.

We claim:

1. A half-duplex/simplex control circuit for providing an interface between a half-duplex line and a pair of simplex lines, one of said simplex lines being used to transmit data selectively forwarded from the half-duplex line and the other of said simplex lines being used to receive data to be selectively forwarded to the half-duplex line, said control circuit comprising:

a receive control logic circuit connected in parallel with the receiving simplex line and the half-duplex line, said receive control logic circuit being responsive to received simplex data to generate a first receive control signal upon detection of a first pattern in such data and a second receive control signal upon detection of a second or a third pattern in such data;

first gating means responsive to the first receive control signal to enable forwarding of received simplex data to the half-duplex line while inhibiting forwarding of received half-duplex data to the transmitting simplex line, said first gating means also being responsive to the second receive control signal to inhibit forwarding of received simplex data while enabling forwarding of received half-duplex data;

a keep alive signal source for providing a continuous idle signal which may be selectively forwarded to the transmitting simplex line;

a transmit control logic circuit connected in parallel with the half-duplex line and the transmitting simplex line, said transmit control logic circuit being responsive to data received on the half-duplex line to generate a first transmit control signal upon detection of a fourth pattern in such data; and second gating means responsive to the first transmit control signal to enable forwarding of received half-duplex data to the transmitting simplex line, said second gating means also being responsive to the second transmit control signal to inhibit forwarding of received half-duplex data while connecting the keep alive signal source to the transmitting simplex line.

2. A half-duplex/simplex control circuit for providing an interface between a half-duplex line and a pair of simplex lines, said control circuit comprising:

a first control circuit responsive to a first pattern in data received on a first of the simplex lines to forward such data to the half-duplex line while blocking any connection between the half-duplex line and the second simplex line, said first pattern being a maximum of three bits in length, said first control circuit also being responsive to second and third patterns in such data to block any connection between the half-duplex line and the first simplex line while enabling a connection between the half-duplex line and the second simplex line; and a second control circuit responsive to a fourth pattern in data received on the half-duplex line to enable a connection between the half-duplex line and the second simplex line, said fourth pattern being a maximum of two bits in length, said second control circuit also being responsive to a fifth pattern of data received on the half-duplex line to block any connection between the half-duplex line and the second simplex line.

3. A half-duplex/simplex control circuit in accordance with claim 2 further including a keep alive signal source for providing a continuous idle signal as an output for being selectively forwarded to the second simplex line and means responsive to detection of the fifth pattern by the second control circuit to gate the output of said keep alive signal source to the second simplex line.

4. A half-duplex/simplex control circuit in accordance with claim 3 further including a first delay circuit in series with the half-duplex line and the second simplex line for delaying half-duplex data to allow the second control circuit time to respond to the fourth pattern in the half-duplex data by blocking the output of the keep alive signal source before the half-duplex data can be introduced onto the second simplex line.

5. A half-duplex/simplex control circuit in accordance with claim 4 further including a second delay circuit in series with the half-duplex line and the first simplex line for delaying simplex data to allow the first control circuit time to respond to the first pattern in the simplex data by blocking the connection between the second simplex line and the half-duplex line before the simplex data can be introduced onto the half-duplex line.

* * * * *